United States Patent
Oowatari (10) Patent No.: US 12,330,316 B2
(45) Date of Patent: Jun. 17, 2025

(54) COORDINATE-SYSTEM SETTING SYSTEM AND COORDINATE-SYSTEM SETTING METHOD

(71) Applicant: FANUC CORPORATION, Yamanashi (JP)

(72) Inventor: Hiroshi Oowatari, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 807 days.

(21) Appl. No.: 17/096,323

(22) Filed: Nov. 12, 2020

(65) Prior Publication Data

US 2021/0154851 A1 May 27, 2021

(30) Foreign Application Priority Data

Nov. 26, 2019 (JP) .................................. 2019-213251

(51) Int. Cl.
*B25J 9/16* (2006.01)
*G05B 19/401* (2006.01)

(52) U.S. Cl.
CPC .......... *B25J 9/1692* (2013.01); *G05B 19/401* (2013.01)

(58) Field of Classification Search
CPC ..... B25J 9/00; B25J 9/16; B25J 9/1679; B25J 9/1692; B25J 9/1656; B25J 9/1664; B25J 18/00; G01B 11/00; G01B 11/005; G01B 11/002; G01B 11/24; G01B 5/00; G01B 5/004; G01B 5/008; G05B 19/00; G05B 19/02; G05B 19/18; G05B 19/401;
(Continued)

(56) References Cited

U.S. PATENT DOCUMENTS

2007/0033819 A1  2/2007  McFarland
2008/0184579 A1  8/2008  McFarland
(Continued)

FOREIGN PATENT DOCUMENTS

EP  2040028 A2  3/2009
JP  S60218108 A  10/1985
(Continued)

OTHER PUBLICATIONS

Japanese Office Action dated Aug. 1, 2023, for Japanese Patent Application No. 2019-213251.

*Primary Examiner* — Khoi H Tran
*Assistant Examiner* — Sarah A Tran
(74) *Attorney, Agent, or Firm* — KARCESKI IP LAW, PLLC (57) ABSTRACT

A coordinate-system setting system including: a probe; a 3D-shape measuring device for measuring contact locations of the probe; and a storage device that stores a 3D model of a part to be measured. The 3D model includes information about an origin position of a coordinate system of the part to be measured. The 3D-shape measuring device measures, when the probe is brought into contact with the part to be measured a plurality of times, the position of a tip portion of a robot and calculates the shape of the part to be measured. The 3D-shape measuring device or a controller of the robot calculates the difference between the calculated shape of the part to be measured and the shape of the 3D model and sets the coordinate system of the part to be measured relative to the tip portion by shifting at least the origin position.

9 Claims, 9 Drawing Sheets

(58) Field of Classification Search
CPC ............ G05B 2219/00; G05B 2219/30; G05B 2219/37; G05B 2219/39; G05B 2219/37193; G05B 2219/39021
USPC .......................................................... 700/254
See application file for complete search history.

(56) References Cited

U.S. PATENT DOCUMENTS

| | | |
|---|---|---|
| 2012/0239194 A1 | 9/2012 | Kagawa |
| 2013/0184871 A1* | 7/2013 | Fudaba .................... B25J 13/02 |
| | | 700/264 |
| 2017/0314910 A1* | 11/2017 | Ikebuchi .................... G06T 7/73 |
| 2019/0099887 A1 | 4/2019 | Huang et al. |
| 2019/0168378 A1* | 6/2019 | Ishikawa .............. G01B 5/0007 |

FOREIGN PATENT DOCUMENTS

| | | |
|---|---|---|
| JP | S62272111 A | 11/1987 |
| JP | H05318351 A | 12/1993 |
| JP | H1097311 A | 4/1998 |
| JP | H1185247 A | 3/1999 |
| JP | H11142139 A | 5/1999 |
| JP | 2002046087 A | 2/2002 |
| JP | 4443497 B2 * | 3/2010 |
| JP | 2012088331 A | 5/2012 |
| JP | 2013010149 A | 1/2013 |
| JP | 2014018878 A | 2/2014 |
| JP | 2015089607 A | 5/2015 |
| JP | 2017198559 A | 11/2017 |
| WO | 2005031254 A1 | 4/2005 |

\* cited by examiner

COORDINATE-SYSTEM SETTING SYSTEM AND COORDINATE-SYSTEM SETTING METHOD

CROSS-REFERENCE TO RELATED APPLICATIONS

This application is based on and claims priority to Japanese Patent Application No. 2019-213251, filed on Nov. 26, 2019, the content of which is incorporated herein by reference in its entirety.

FIELD OF THE INVENTION

The present invention relates to a coordinate-system setting system and a coordinate-system setting method.

BACKGROUND OF THE INVENTION

There is a well-known technique in which a touch probe is mounted on a tip portion of a robot, and while the robot is placed in a plurality of positions, the tip of the touch probe is brought into contact with a predetermined jig in each of the positions, thereby the position of the tip of the touch probe relative to the robot is set.

There is another well-known technique in which a subject to be detected is mounted on a tip portion of a robot, and while the robot is placed in a plurality of positions, the position of the subject to be detected is measured in each of the positions, thereby the position of the subject to be detected relative to the robot is set. Refer to, for example, Japanese Unexamined Patent Application, Publication No. S62-272111.

In still another well-known technique, a jig is brought into contact with the tip of a tool mounted on a tip portion of a robot, and the position of the tip of the tool is set by measuring the position of the jig by using a 3D measuring machine. Refer to, for example, Japanese Unexamined Patent Application, Publication No. H11-85247.

SUMMARY OF THE INVENTION

A coordinate-system setting system according to a first aspect of this disclosure includes: a probe capable of coming into contact with a tip portion of a robot; a 3D-shape measuring device for measuring contact locations of the probe; and a storage device that stores a 3D model of a part to be measured, wherein the part to be measured is a tool mounted on the robot, a workpiece on which a task is to be performed by means of the tool, or a jig for fixing the workpiece, the 3D model includes information about an origin position serving as an origin of a coordinate system of the part to be measured, the 3D-shape measuring device performs, when the probe is brought into contact with the part to be measured a plurality of times, position measurement processing which measures a position of the tip portion of the robot and performs shape calculation processing which calculates a shape of the part to be measured, and the 3D-shape measuring device or a robot controller of the robot performs difference calculation processing for calculating the difference between the calculated shape of the part to be measured and a shape of the 3D model and performs coordinate-system setting processing for setting the coordinate system of the part to be measured relative to the position of the tip portion by shifting at least the origin position in the 3D model by using the calculated difference.

A coordinate-system setting method according to a second aspect of this disclosure includes: arranging a 3D-shape measuring device near a robot; measuring a position of a tip portion of the robot by means of the 3D-shape measuring device by bringing a probe into contact with the tip portion a plurality of times; calculating a shape of a part to be measured, which is a tool mounted on the robot, a workpiece on which a task is performed by means of the tool, or a jig for fixing the workpiece, by means of the 3D-shape measuring device by bringing the probe into contact with the part to be measured a plurality of times; causing the 3D-shape measuring device or a robot controller of the robot to calculate the difference between the calculated shape of the part to be measured and a shape of a 3D model stored in a storage device; and causing the 3D-shape measuring device or the robot controller of the robot to set a coordinate system of the part to be measured relative to the position of the tip portion by shifting at least an origin position in the 3D model by using the calculated difference.

DESCRIPTION OF EMBODIMENT(S) OF THE INVENTION

A coordinate-system setting system according to an embodiment of the present invention will now be described with reference to the drawings. This coordinate-system setting system sets a coordinate system of a tool (part to be measured) 30 mounted on a tip portion of a robot 1.

Figure 1:
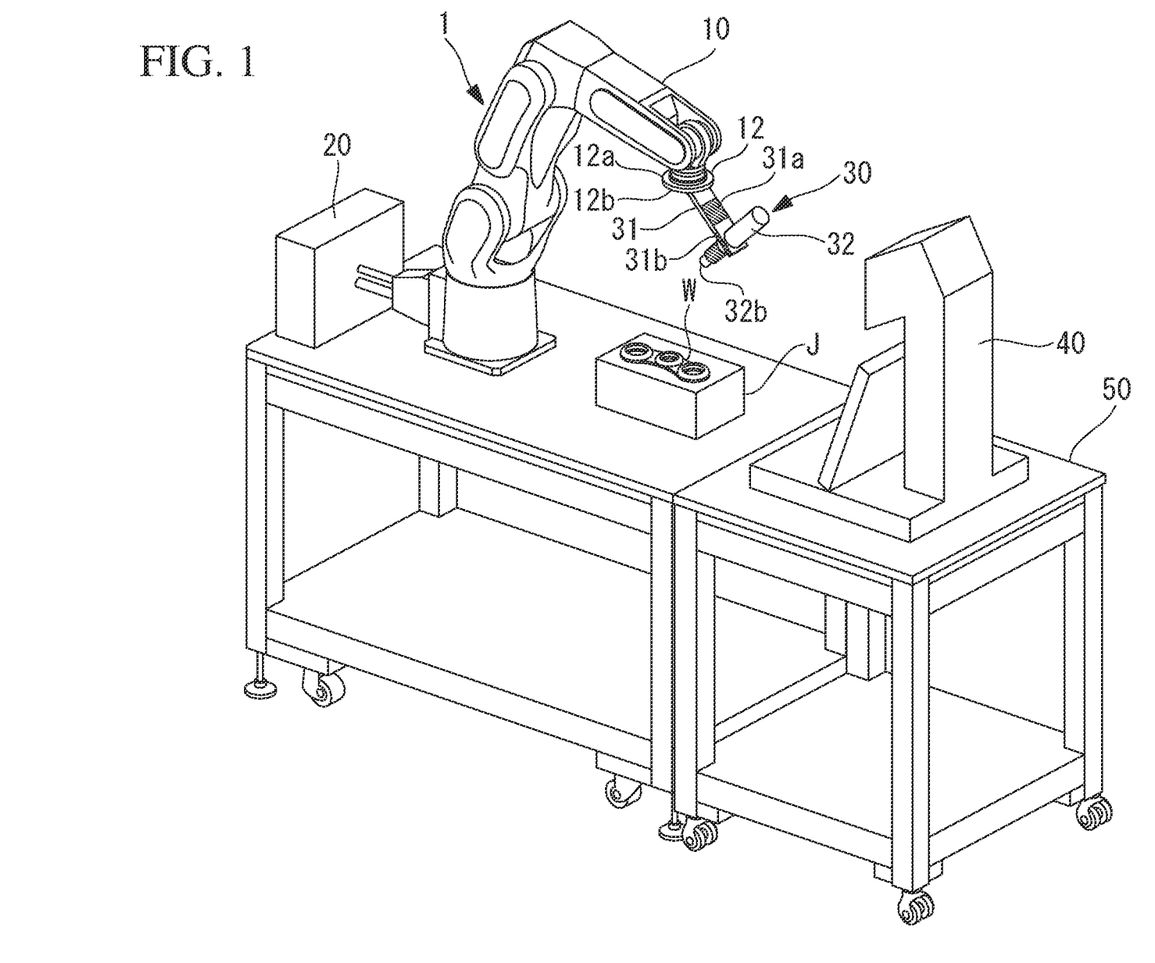
FIG. 1 is a schematic configuration diagram of a coordinate-system setting system according to an embodiment.

As shown in FIG. 1, the robot 1 in this embodiment includes an arm 10 and a robot controller 20 for controlling the arm 10. In addition, this robot 1 has the tool 30 mounted on a wrist flange 12, serving as a tip portion of the arm 10, so that the robot 1 performs a predetermined task, such as arc welding, by using the tool 30. In the case where the tool 30 is a hand, the robot 1 performs a predetermined task, such as extraction of a workpiece W, by using the tool 30. The tool 30 may be any of known various tools, as long as it can be mounted on the robot 1.

The arm 10 of the robot 1 includes a plurality of arm members and a plurality of joints. In addition, the arm 10 includes a plurality of servo motors 11 for driving the respective plurality of joints (refer to FIG. 4). As the servo motors 11, various types of servo motors, such as a revolving motor and a linear motor, can be used. Each of the servo motors 11 has an operating-position detection device for detecting the operating position and operating speed thereof, and one example of the operating-position detection device is an encoder. Detection values of the operating-position detection devices are transmitted to the robot controller 20.

Figure 4:
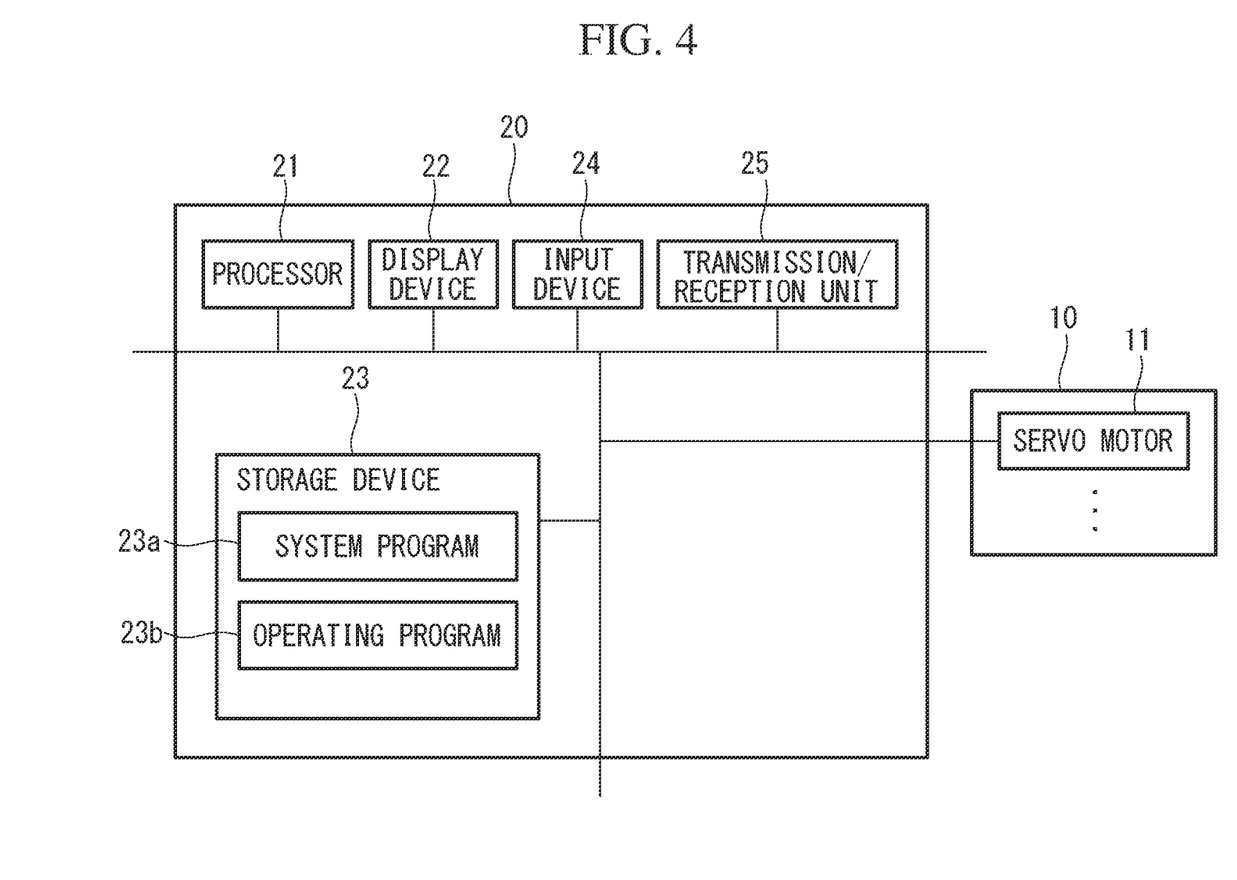
FIG. 4 is a block diagram of a robot controller in this embodiment.

As shown in FIG. 4, the robot controller 20 includes: a processor 21, such as a CPU; a display device 22; a storage device 23 having a nonvolatile storage, a ROM, a RAM, etc.; an input device 24, which is a keyboard, a touch panel, an operator panel, or the like; and a transmission/reception unit 25 for performing transmission and reception of signals. The input device 24 and the transmission/reception unit 25 function as an input unit. The robot controller 20 is connected to a 3D measuring machine (3D-shape measuring device) 40, which will be described later, and to each of the servo motors 11.

Although the robot controller 20 is provided in the robot 1 in this embodiment, the robot controller 20 may be a computer provided outside the robot 1, so that this computer may include the above-described configuration.

A system program 23a is stored in the storage device 23, and this system program 23a serves as the basic functions of the robot controller 20. An operating program 23b is also stored in the storage device 23. The operating program 23b is produced with respect to a reference coordinate system of the robot 1 and is used to successively place the tip or the like of the tool 30 mounted on the tip portion of the arm 10 at a plurality of predetermined welding positions in this reference coordinate system.

Figure 2:
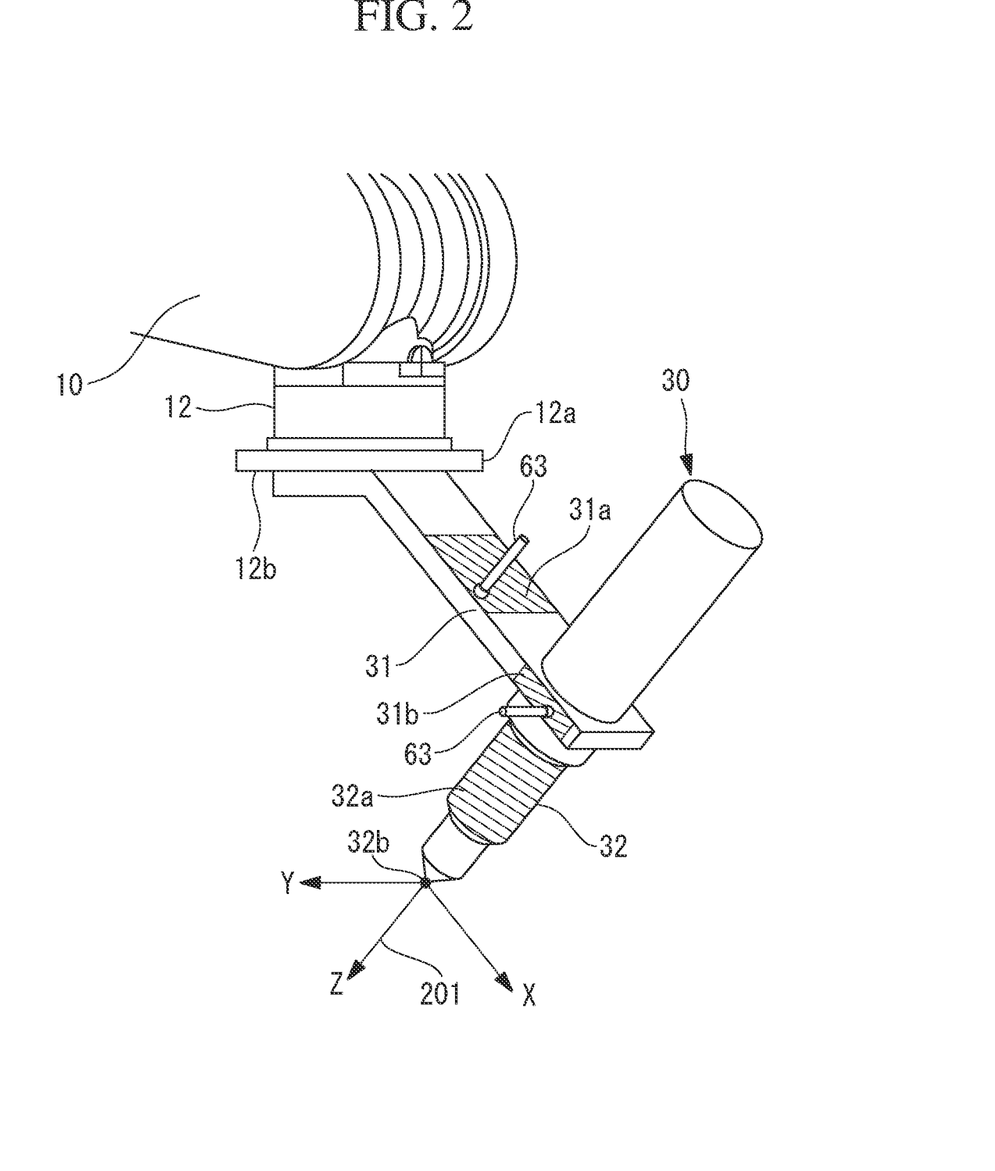
FIG. 2 is a perspective view of a tip portion of a robot for which a coordinate system is set in the coordinate-system setting system according to this embodiment.

The tool 30 in this embodiment has a fixing member 31 fixed to the wrist flange 12 and a tool main body 32 fixed to the fixing member 31 (FIGS. 1 and 2). In one example, the tool 30 performs welding by arc discharging from a tip 32b of the tool main body 32.

The 3D measuring machine 40 in this embodiment is fixed to the top of a movable cart 50, and the 3D measuring machine 40 can be moved by means of the movable cart 50.

Figure 3:
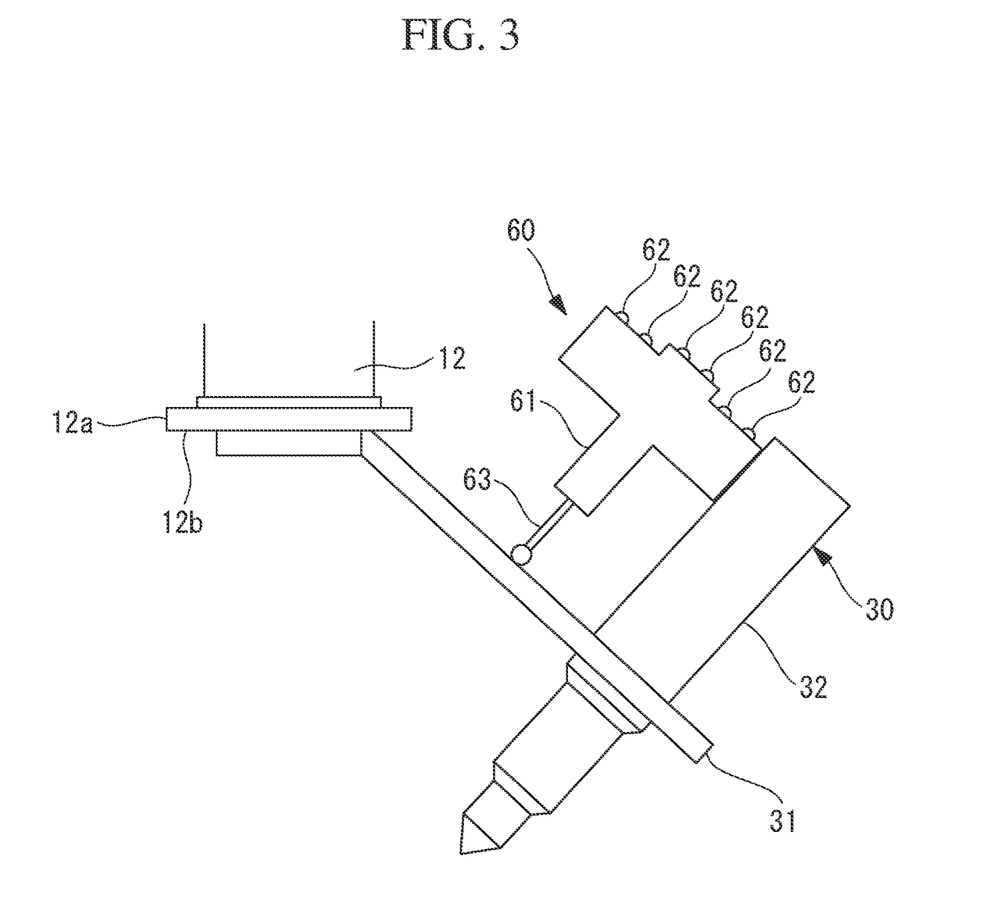
FIG. 3 is a side elevational view of the tip portion of the robot in this embodiment.

In addition, the coordinate-system setting system according to this embodiment has a probe device 60 supported by a hand of the operator (FIG. 3). The probe device 60 may be a portion of the 3D measuring machine 40.

As the 3D measuring machine 40 and the probe device 60, a desktop 3D measuring machine manufactured by, for example, Keyence® can be used. More specifically, one of the handheld probe 3D measuring machine MX series can be used. In this embodiment, as shown in FIG. 3, the probe device 60 has: a grip section 61 held by the operator; a plurality of light-emitting sections 62 provided at one end of the grip section 61; and a probe 63 provided at the other end of the grip section 61.

Each of the plurality of light-emitting sections 62 is, for example, an LED. The plurality of light-emitting sections 62 are arranged with spaces interposed therebetween in a direction intersecting the direction in which the grip section 61 extends.

Figure 5:
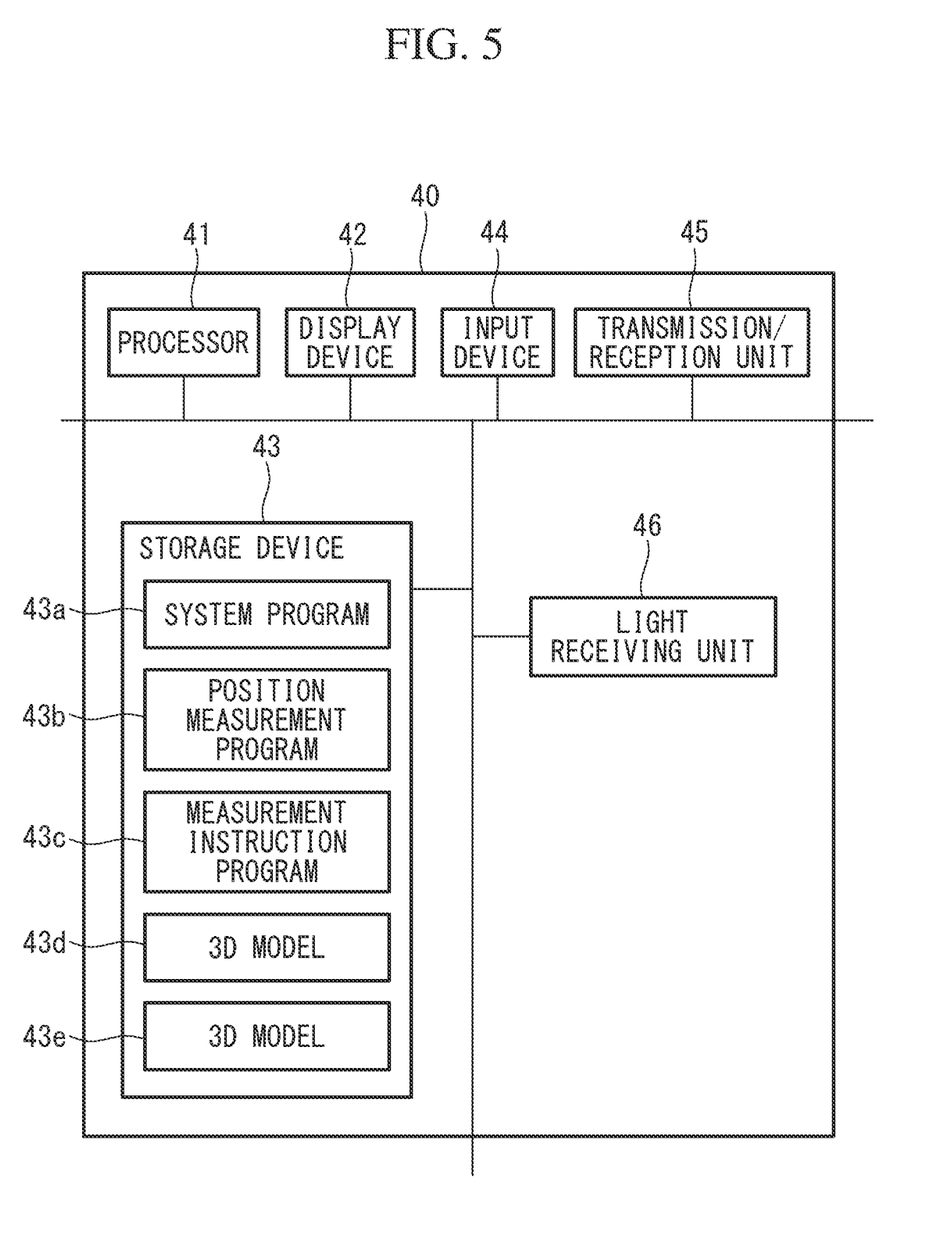
FIG. 5 is a block diagram of a 3D measuring machine in this embodiment.

As shown in FIG. 5, the 3D measuring machine 40 includes: a processor 41, such as a CPU; a display device 42; a storage device 43 having a nonvolatile storage, a ROM, a RAM, etc.; an input device 44, which is a keyboard, a touch panel, an operator panel, or the like; a transmission/reception unit 45 for performing transmission and reception of signals; and a light receiving unit 46.

A system program 43a is stored in the storage device 43, and this system program 43a serves basic functions of the 3D measuring machine 40. A position measurement program 43b is also stored in the storage device 43. In one example, the light receiving unit 46 is a known 3D distance sensor. The light receiving unit 46 of the 3D measuring machine 40 receives light from each of the light-emitting sections 62, and the 3D measuring machine 40 measures the contact location of the probe 63 on the basis of the position measurement program 43b.

The storage device 43 stores a 3D model 43d corresponding to portions of the tool 30. In one example, the storage device 43 stores the 3D model 43d corresponding to portions of the tool 30, said portions being indicated by hatching in FIG. 2. The storage device 43 may store 3D CAD data as the model. In addition, the 3D model 43d contains information on the position of the tip of the tool 30 as information on an origin position. In one example, the 3D model 43d is a model of a plurality of portions of interest that are spaced apart from one another.

Note that a position other than the position of the tip of the tool 30 may be contained as the origin position. In this embodiment, a model coordinate system is set in the 3D model 43d with respect to the central axis line of an outer circumferential surface 32a of the tool main body 32 and the directions in which surfaces 31a and 31b extend.

In addition, the 3D measuring machine 40 displays position measurement instructions on the display device 42 on the basis of a measurement instruction program 43c stored in the storage device 43.

Figure 6:
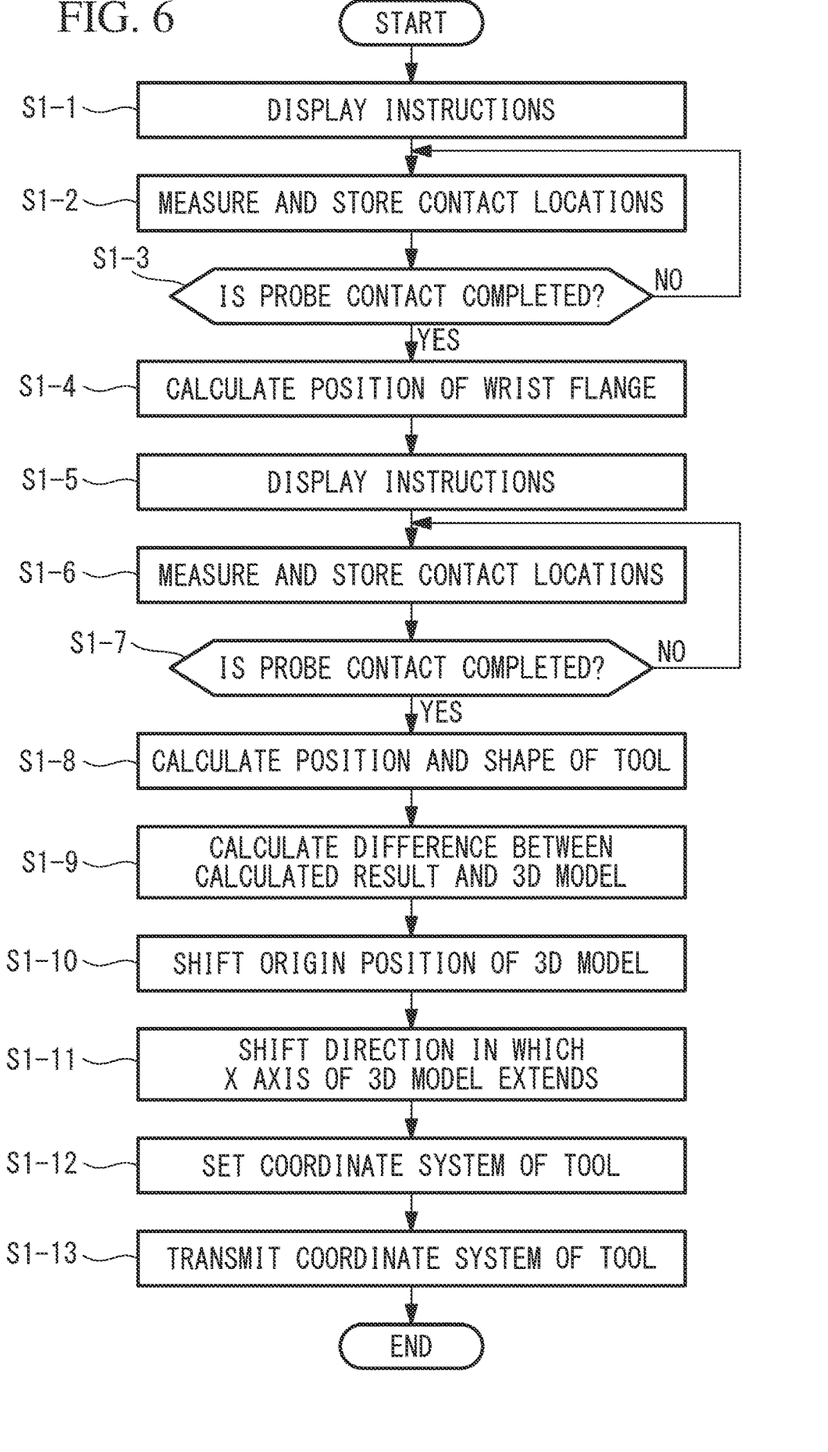
FIG. 6 is a flowchart showing one example of processing performed by the 3D measuring machine in this embodiment.

The 3D measuring machine 40 performs, for example, the following processing on the basis of the position measurement program 43b and the measurement instruction program 43c (FIG. 6). Before the following processing is performed, the operator disposes the 3D measuring machine 40 near the robot 1 by means of the movable cart 50.

The 3D measuring machine 40 displays instructions on the display device 42 on the basis of the measurement instruction program 43c (step S1-1). For example, instructions for successively bringing the probe 63 into contact with a plurality of positions on a circumferential surface 12a of the wrist flange 12 of the robot 1 and for successively bringing the probe 63 into contact with a plurality of positions on an axial tip surface 12b of the wrist flange 12 are displayed on the display device 42.

On the basis of these instructions, the operator brings the probe 63 of the probe device 60 into contact with a plurality of positions on the circumferential surface 12a and a plurality of positions on the tip surface 12b. At this time, on the basis of the position measurement program 43b, the 3D measuring machine 40 measures the contact location of the probe 63 at each contact and stores the measured contact locations in the storage device 43 (step S1-2). When contact operation of the probe 63 based on the above-described instructions is completed (step S1-3), the 3D measuring machine 40 calculates, on the basis of the position measurement program 43b, the position of the wrist flange 12 by using the plurality of measured contact locations (step S1-4). The calculation of the position of the wrist flange 12 in step S1-4 is performed as position measurement processing. In this manner, steps S1-3 and S1-4 are performed to measure the position of the wrist flange 12.

Subsequently, the 3D measuring machine 40 displays instructions on the display device 42 on the basis of the measurement instruction program 43c (step S1-5). For example, instructions for successively bringing the probe 63 into contact with a plurality of circumferentially arranged positions on the partial circumferential surface 32a of the tool main body 32, a plurality of positions on one thicknesswise surface 31a of the fixing member 31, and a plurality of positions on an end surface 31b of the fixing member 31 are displayed on the display device 42. The displayed instructions should preferably indicate that the probe be successively brought into contact with a plurality of positions that are different from one another in the axial direction and the circumferential direction of the tool main body 32. Note that if step S1-5 is described in written procedures, etc., step S1-5 is omitted.

On the basis of these instructions, the operator brings the probe 63 of the probe device 60 into contact with a plurality of positions on the circumferential surface 32a, a plurality of positions on the surface 31a, and a plurality of positions on the surface 31b. At this time, on the basis of the position measurement program 43b, the 3D measuring machine 40 measures the contact location of the probe 63 at each contact and stores the measured contact locations in the storage device 43 (step S1-6). When contact operation of the probe 63 based on the above-described instructions is completed (step S1-7), the 3D measuring machine 40 calculates, on the basis of the position measurement program 43b, the position and shape of the tool 30 by using the plurality of measured contact locations (step S1-8). The calculation of the position and shape of the tool 30 in step S1-8 is performed as shape calculation processing. The position obtained in step S1-8 is a position relative to, for example, the wrist flange 12.

Subsequently, on the basis of the position measurement program 43b, the 3D measuring machine 40 calculates the difference between the calculated shape of the tool 30 and the shape of the 3D model 43d (step S1-9). If, for example, the position of the central axis line of the circumferential surface 32a that has been calculated by bringing the probe 63 into contact with the plurality of positions on the circumferential surface 32a is shifted relative to the position of the central axis line of the corresponding circumferential surface of the 3D model 43d, this shift is calculated as the difference. In addition, a surface of the fixing member 31, said surface coming into contact with the tip surface 12b, is disposed at the same position as the position of the tip surface 12b. For this reason, if the direction in which the end surface 31b, which is calculated by bringing the probe 63 into contact with the end surface 31b, extends is shifted relative to the direction in which the corresponding end surface of the 3D model 43d extends, as viewed from the tip surface 12b of the wrist flange 12, this shift is calculated as the difference.

Subsequently, on the basis of the position measurement program 43b, the 3D measuring machine 40 shifts the origin position of the model coordinate system of the 3D model 43d by using the difference that has been calculated in step S1-9 (step S1-10). In addition, on the basis of the position measurement program 43b, the 3D measuring machine 40 shifts the direction in which, for example, the X axis of the model coordinate system of the 3D model 43d extends by using the difference that has been calculated in step S1-9 (step S1-11).

In addition, as shown in FIG. 2, the robot controller 20 or the 3D measuring machine 40 sets a coordinate system 201 of the tool 30 relative to the position of the wrist flange 12 by using the origin position and the direction in which the X axis extends that have been shifted in steps S1-10 and S1-11, respectively (step S1-12). Note that step S1-11 can be omitted according to the required conditions.

In the case where the 3D measuring machine 40 performs step S1-12, the 3D measuring machine 40 transmits, to the robot controller 20, the coordinate system 201 relative to the position of the wrist flange 12 (step S1-13). By doing so, the robot controller 20 controls the robot 1 by using the coordinate system 201. Note that the position of the wrist flange 12 in the reference coordinate system of the robot 1 is set in the robot controller 20, for example, when the robot 1 is manufactured.

Figure 7:
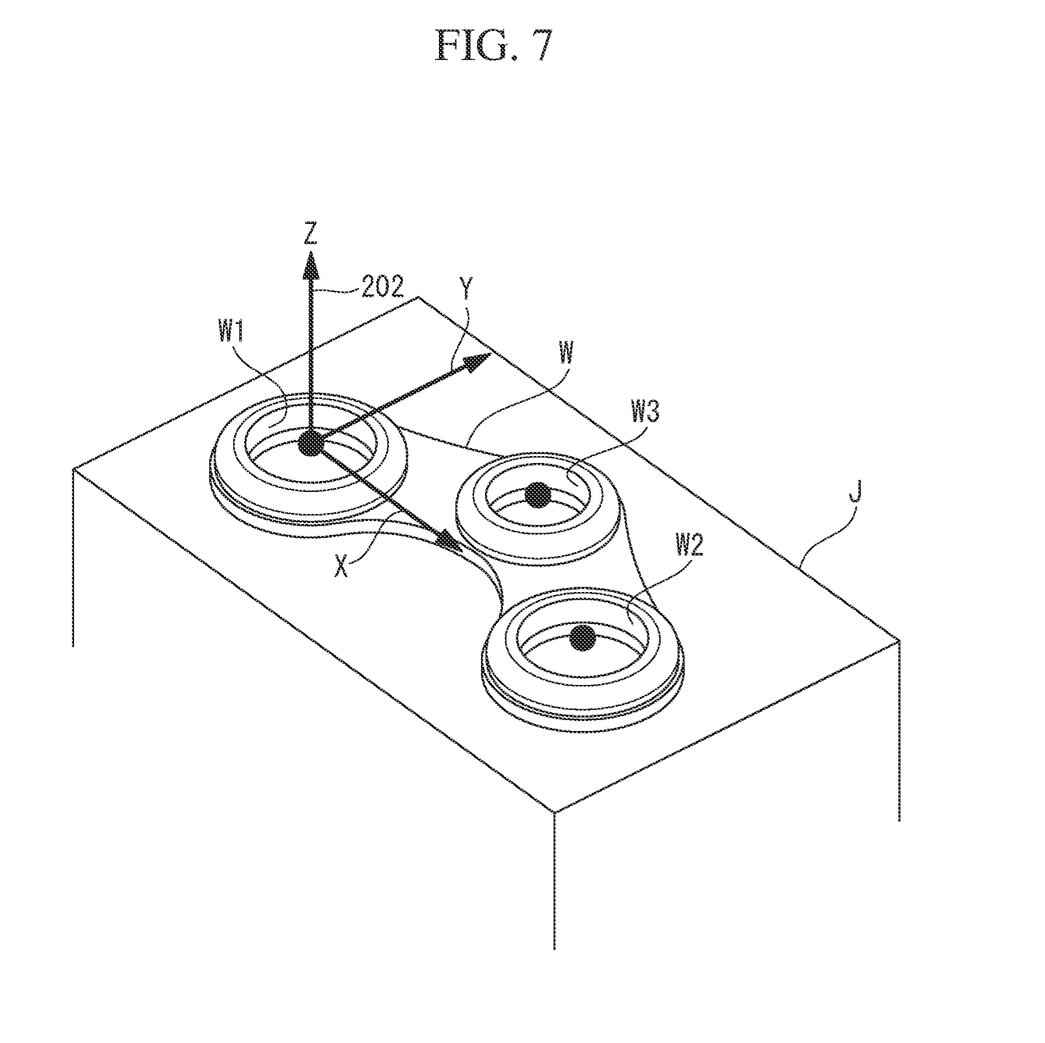
FIG. 7 is a perspective view of a workpiece for which a coordinate system is set in a coordinate-system setting system according to a modification of this embodiment.

In the above-described embodiment, a coordinate system 202 of the workpiece (part to be measured) W or a jig (part to be measured) J for fixing the workpiece W may be set, as shown in FIG. 7.

In this case, a 3D model 43e corresponding to portions of the workpiece W is stored in the storage device 43. In one example, the storage device 43 stores the 3D model 43e corresponding to a first feature W1, a second feature W2, and a third feature W3 of the workpiece W in FIG. 7. In one example, each of the first feature W1, the second feature W2, and the third feature W3 is a circular inner circumferential surface. In addition, in this embodiment, the 3D model 43e is a model of a plurality of portions of interest that are separated from one another.

In addition, the 3D model 43e includes information on the center position of the first feature W1 as information about the origin position. Note that a position other than the center of the first feature W1 may be included as the origin position. In this embodiment, a model coordinate system is set in the 3D model 43e with respect to the central axis line of the first feature W1, as well as a direction passing through this central axis line and the central axis line of the second feature W2.

Figure 8:
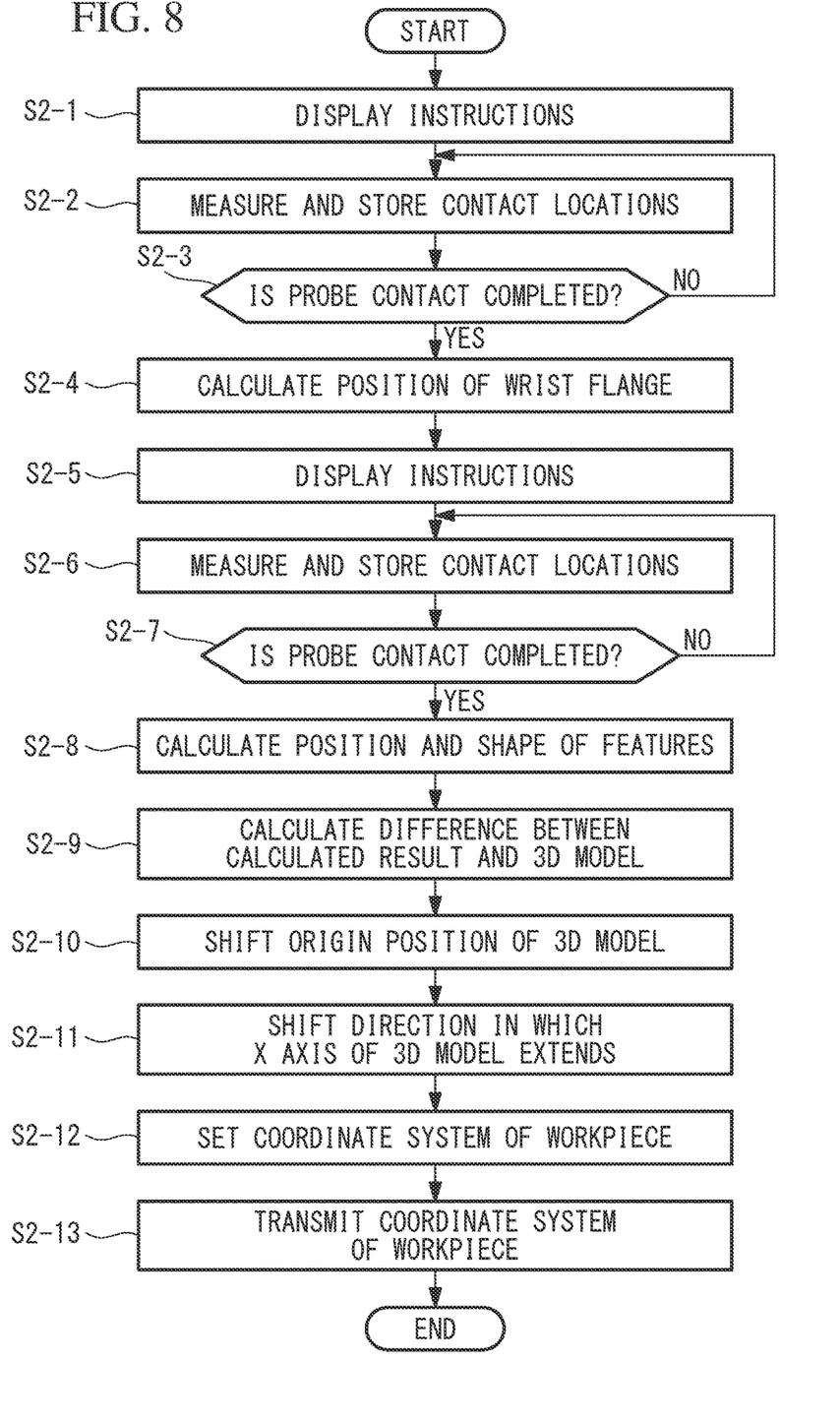
FIG. 8 is a flowchart showing another example of processing performed by the 3D measuring machine in this embodiment.

In this modification, the 3D measuring machine 40 performs, for example, the following processing on the basis of the position measurement program 43b and the measurement instruction program 43c (FIG. 8). Before the following processing is performed, the operator disposes the 3D measuring machine 40 near the robot 1 by means of the movable cart 50. The coordinate system 202 of the workpiece W is set in the following description, but a coordinate system of the jig J can be set in a similar or the same way.

The 3D measuring machine 40 displays the same instructions as in step S1-1 on the display device 42 on the basis of the measurement instruction program 43c (step S2-1). In addition, on the basis of the position measurement program 43b, the 3D measuring machine 40 stores, in the storage device 43, the contact locations that have been measured in the same manner as in step S1-2 (step S2-2). When contact operation of the probe 63 based on the above-described instructions is completed (step S2-3), the 3D measuring machine 40 obtains the position of the wrist flange 12 through calculation in the same manner as in step S1-4 (step S2-4).

Subsequently, the 3D measuring machine 40 displays instructions on the display device 42 on the basis of the measurement instruction program 43c (step S2-5). For example, instructions for successively bringing the probe 63 into contact with a plurality of positions of the first feature W1, a plurality of positions of the second feature W2, and a plurality of positions of the third feature W3 in the workpiece W are displayed on the display device 42. The displayed instructions should preferably indicate that the probe be successively brought into contact with a plurality of positions that are different from one another in the axial direction and circumferential direction of each of the features W1, W2, and W3.

On the basis of these instructions, the operator brings the probe 63 of the probe device 60 into contact with a plurality of positions of the first feature W1, a plurality of positions of the second feature W2, and a plurality of positions of the third feature W3. At this time, on the basis of the position measurement program 43b, the 3D measuring machine 40 measures the contact location of the probe 63 at each contact and stores the measured contact locations in the storage device 43 (step S2-6). When the contact operation of the probe 63 based on the above-described instructions is completed (step S2-7), the 3D measuring machine 40 calculates, on the basis of the position measurement program 43b, the positions and shapes of the features W1, W2, and W3 by using the plurality of measured contact locations (step S2-8). The positions obtained in step S2-8 are positions relative to, for example, the wrist flange 12.

Subsequently, on the basis of the position measurement program 43b, the 3D measuring machine 40 calculates the difference between the shape of the workpiece W, which is obtained from each of the calculated features W1, W2, and W3, and the shape of the 3D model 43e (step S2-9). If, for example, the distance between the first feature W1 and the second feature W2 is shifted relative to the distance between the first feature W1 and the second feature W2 in the 3D model 43e, this shift is the difference.

Subsequently, on the basis of the position measurement program 43b, the 3D measuring machine 40 shifts the origin position of the model coordinate system of the 3D model 43e by using the difference that has been calculated in step S2-9 (step S2-10). In addition, on the basis of the position measurement program 43b, the 3D measuring machine 40 shifts the direction in which, for example, the X axis of the model coordinate system of the 3D model 43e extends by using the difference that has been calculated in step S2-9 (step S2-11).

In addition, as shown in FIG. 7, the robot controller 20 or the 3D measuring machine 40 sets the coordinate system 202 of the workpiece W relative to the position of the wrist flange 12 by using the origin position and the direction in which the X axis extends that have been shifted in steps S2-10 and S2-11, respectively (step S2-12). Note that step S2-11 can be omitted according to the required conditions.

In the case where the 3D measuring machine 40 performs step S2-12, the 3D measuring machine 40 transmits, to the robot controller 20, the coordinate system 202 relative to the position of the wrist flange 12 (step S2-13). By doing so, the robot controller 20 controls the robot 1 by using the coordinate system 202.

Note that some or all of the position measurement program 43b, the measurement instruction program 43c, and the 3D models 43d and 43e may be stored in the storage device 23 of the robot controller 20. In this case, the robot controller 20 may receive measurement results of the contact locations of the probe 63 from the 3D measuring machine 40, and the robot controller 20 may perform some or all of steps S1-1 to S1-12 and steps S2-1 to S2-12. In addition, the 3D measuring machine 40 may be provided integrally with the robot controller 20.

In this manner, in the above-described embodiment, by bringing the probe 63 into the contact states, the position of the tip portion of the robot 1 is obtained, and the shape of the part to be measured is calculated. In addition, the difference between the calculated shape of the part to be measured and the shape of the corresponding 3D model 43d or 43e is calculated, and the origin position of the 3D model is shifted by using the calculated difference, whereby the coordinate system of the part to be measured relative to the tip portion of the robot 1 is set. For this reason, the coordinate system of the part to be measured, which is the tool 30, the workpiece W, or the jig J, relative to the tip portion of the robot 1 is set accurately with a simple task.

In addition, each of the 3D models 43d and 43e is a model of a portion of interest in the part to be measured. More specifically, each of the 3D models 43d and 43e is a model of a portion of interest in the vicinity of the origin position of the part to be measured. In this manner, because only models of a portion of interest are stored, the amount of processing at the time the above-described differences are calculated is reduced, and the amount of data of the 3D models 43d and 43e in the storage device 43 is also reduced.

In addition, each of the 3D models 43d and 43e is a model of a plurality of portions of interest in the part to be measured. More specifically, each of the 3D models 43d and 43e is a model of a plurality of portions of interest that are separated from one another in the part to be measured. With this configuration, even in the case where the part to be measured is large, it is possible to accurately calculate the difference between the calculated shape of the part to be measured and the shape of the corresponding 3D model 43d or 43e while the amount of processing at the time the above-described difference is calculated is reduced, and the amount of data of the 3D model in the storage device 43 is reduced, etc.

In addition, in the above-described embodiment, when the probe 63 is brought into contact with each of the surfaces 31a, 31b, and 32a in step S1-7 a prescribed number of times or more, the calculation in step S1-8 is performed. This configuration allows an operator who is not accustomed to setting of a coordinate system of the part to be measured to perform the task of setting a coordinate system accurately and smoothly.

In addition, in the above-described embodiment, the surface with which the probe 63 is brought into contact is displayed on the display device 42 of the 3D measuring machine 40 or the display device 22 of the robot controller 20. This configuration is also advantageous in allowing an operator who is not accustomed to setting of a coordinate system of the part to be measured to perform the task of setting a coordinate system accurately and smoothly.

In addition, in the above-described embodiment, the operator brings the probe 63 into contact with the part to be measured while the operator holds the probe device 60 including the probe 63, whereby the shape of the part to be measured is calculated. This configuration makes the setting of the coordinate system of the part to be measured easy. When the coordinate system of the part to be measured is set easily, coordinate system setting is performed periodically or frequently in the manufacturing line, etc. This is very advantageous in improving the quality of products that are manufactured in the manufacturing line. Note that the probe 63 may be supported by another robot, so that this robot, similarly to the operator, may bring the probe 63 into contact with the tip portion of the robot 1 and the part to be measured.

Figure 9:
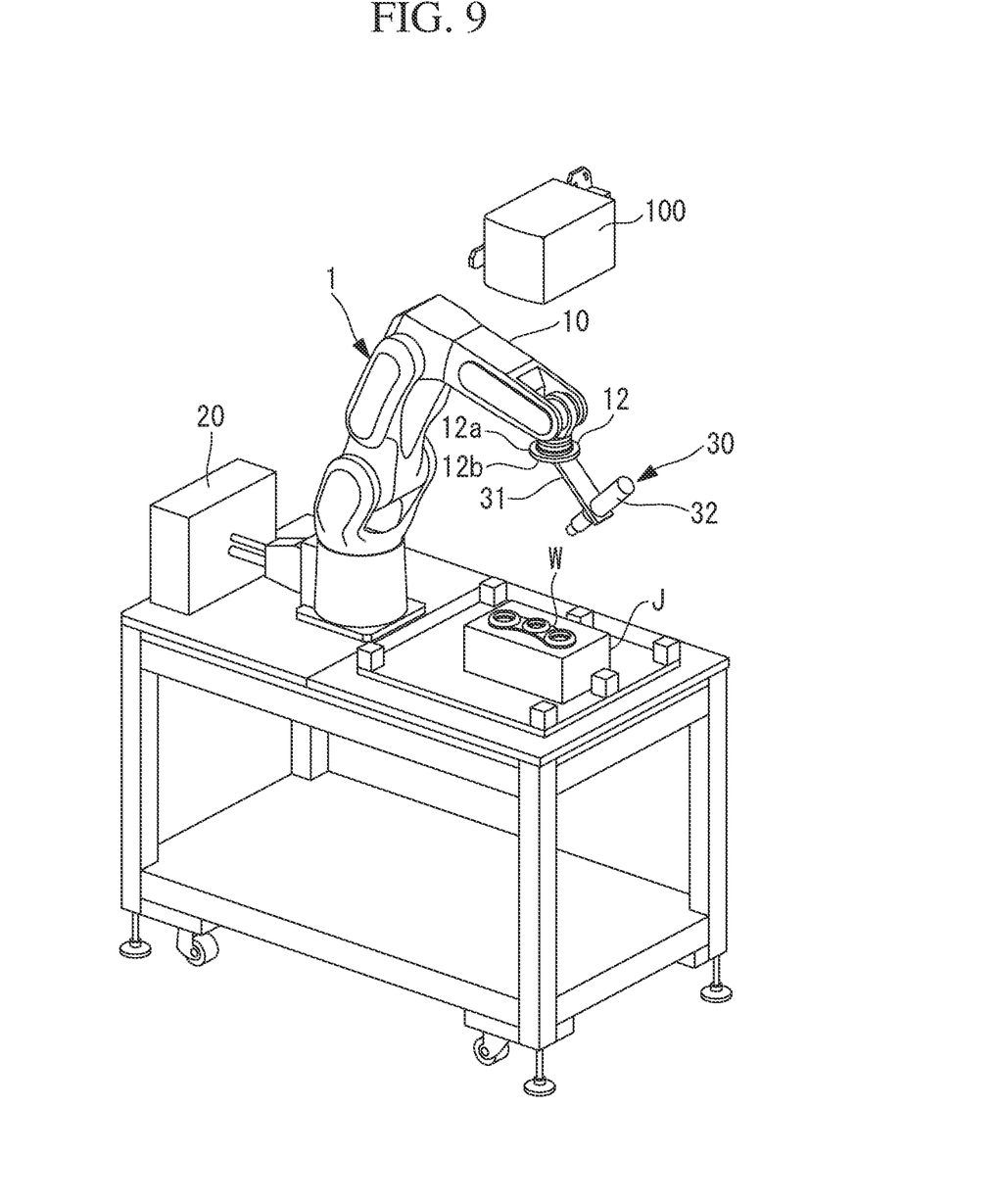
FIG. 9 is a schematic configuration diagram of a coordinate-system setting system according to another modification of this embodiment.

Note that, as shown in FIG. 9, a 3D visual sensor 100 may be used, instead of the 3D measuring machine 40. In this case, on the basis of the position measurement program 43b, the robot controller 20 or another computer detects the contact locations of the probe 63 by using data obtained by the 3D visual sensor 100.

The invention claimed is:
1. A coordinate-system setting system comprising:
a portable probe being capable of coming into contact with a tip portion of a robot, wherein the portable probe is separate from the robot and does not move together with the robot and wherein the portable probe is held by an operator;

a 3D-shape measuring device for measuring contact locations of the portable probe; and a storage device that stores a 3D model of a tool mounted on the tip portion of the robot, wherein the 3D model includes information about an origin position serving as an origin of a coordinate system of the tool, the 3D-shape measuring device is configured to perform:

position measurement processing which measures a position of the tip portion of the robot; and shape calculation processing which calculates a shape of the tool when the operator brings the portable probe into contact with the tool mounted on the tip portion a plurality of times, and the 3D-shape measuring device or a robot controller of the robot is configured to perform:

difference calculation processing for calculating a difference between the calculated shape of the tool and a shape of the 3D model; and coordinate-system setting processing for setting the coordinate system of the tool relative to the measured position of the tip portion by shifting at least the origin position in the 3D model by using the calculated difference.

2. The coordinate-system setting system according to claim 1, wherein the 3D-shape measuring device or the robot controller sets the coordinate system of the tool in the coordinate-system setting processing by shifting the origin position and an X axial direction in the 3D model by using the calculated difference.

3. The coordinate-system setting system according to claim 1, wherein the 3D model is a model of a portion of interest in the tool, and when the portable probe is brought into contact with a position corresponding to the model of the portion of interest in the tool a plurality of times, the 3D-shape measuring device calculates the shape of the tool corresponding to the model of the portion of interest in the shape calculation processing.

4. The coordinate-system setting system according to claim 1, wherein the 3D model is a model of a plurality of portions of interest in the tool, and when the portable probe is brought into contact with positions corresponding to the model of the plurality of portions of interest in the tool a plurality of times, the 3D-shape measuring device calculates the shape of the tool corresponding to the model of the plurality of portions of interest in the shape calculation processing.

5. The coordinate-system setting system according to claim 1, wherein the 3D-shape measuring device or the robot controller performs the shape calculation processing when the portable probe is brought into contact with each of a plurality of surfaces in the tool a prescribed number of times or more.

6. The coordinate-system setting system according to claim 1, further comprising:

a display device which displays a surface of the tool, the surface being a surface with which the portable probe should be brought into contact.

7. The coordinate-system setting system according to claim 1, further comprising:

a probe device including the portable probe, wherein the probe device is configured to be supported by a hand of the operator, and the 3D-shape measuring device performs the shape calculation processing when the portable probe is brought into contact with the tool a plurality of times by the operator moving the probe device.

8. The coordinate-system setting system according to claim 1, wherein the 3D-shape measuring device is a 3D visual sensor or a 3D measuring machine.

9. A coordinate-system setting method comprising:

arranging a 3D-shape measuring device near a robot;

measuring a position of a tip portion of the robot by the 3D-shape measuring device by bringing a portable probe, which is separate from the robot and does not move together with the robot and which is held by an operator, into contact with the tip portion of the robot a plurality of times;

calculating a shape of a tool mounted on the robot by the 3D-shape measuring device by bringing the portable probe into contact with the tool a plurality of times;

causing the 3D-shape measuring device or a robot controller of the robot to calculate a difference between the calculated shape of the tool and a shape of a 3D model stored in a storage device; and causing the 3D-shape measuring device or the robot controller of the robot to set a coordinate system of the tool relative to the measured position of the tip portion by shifting at least an origin position in the 3D model by using the calculated difference.

* * * * *